(12) United States Patent
Fanelli et al.

(10) Patent No.: US 8,295,525 B1
(45) Date of Patent: Oct. 23, 2012

(54) FLASH-N-SCRATCH

(75) Inventors: Joe J. Fanelli, Phoenix, AZ (US); Jay M. Fanelli, Lafayette, CA (US)

(73) Assignee: The Hesed Consortia, LLC, Phoenix, AZ (US)

( * ) Notice: Subject to any disclaimer, the term of this patent is extended or adjusted under 35 U.S.C. 154(b) by 1341 days.

(21) Appl. No.: 11/769,453

(22) Filed: Jun. 27, 2007

Related U.S. Application Data

(60) Provisional application No. 60/816,958, filed on Jun. 27, 2006.

(51) Int. Cl.
*H04R 9/06* (2006.01)

(52) U.S. Cl. .............. 381/334; 381/77; 381/79; 381/87; 381/332; 381/333; 381/388

(58) Field of Classification Search .................. 381/334, 381/119, 77, 79, 87, 332, 333, 388; 455/84
See application file for complete search history.

(56) References Cited

U.S. PATENT DOCUMENTS

| | | | |
|---|---|---|---|
| 2006/0123982 A1* | 6/2006 | Christensen | 84/723 |
| 2006/0159291 A1* | 7/2006 | Fliegler et al. | 381/118 |

OTHER PUBLICATIONS

Mat Hans, April Slayden, and Mark Smith; "DJammer: a New Digital, Mobile, Virtual, Personal Musical Instrument," Multimedia and Expo, 2005. ICME 2005. IEEE International Conference, Jul. 6-8, 2005.*

* cited by examiner

*Primary Examiner* — Vivian Chin
*Assistant Examiner* — Paul Kim
(74) *Attorney, Agent, or Firm* — Blakely, Sokoloff, Taylor & Zafman LLP

(57) ABSTRACT

This invention provides a personal and wearable audio system comprising a first and second component; wherein each of the first and second component comprises an audio-signal generator interactively connected to a modulator and optionally, a signal interrupter; at least one speaker for amplifying the audio signal from the audio-signal generators, modulators and optional interrupters; and a means for attaching the first and second components to a wearer's body.

19 Claims, 4 Drawing Sheets

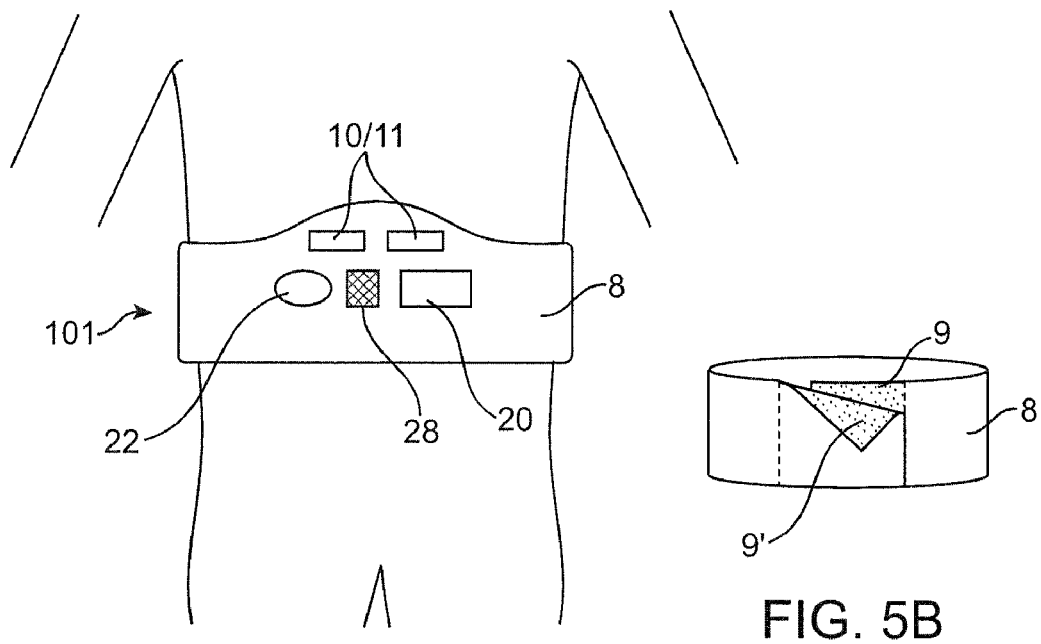
FIG. 5A
FIG. 5B
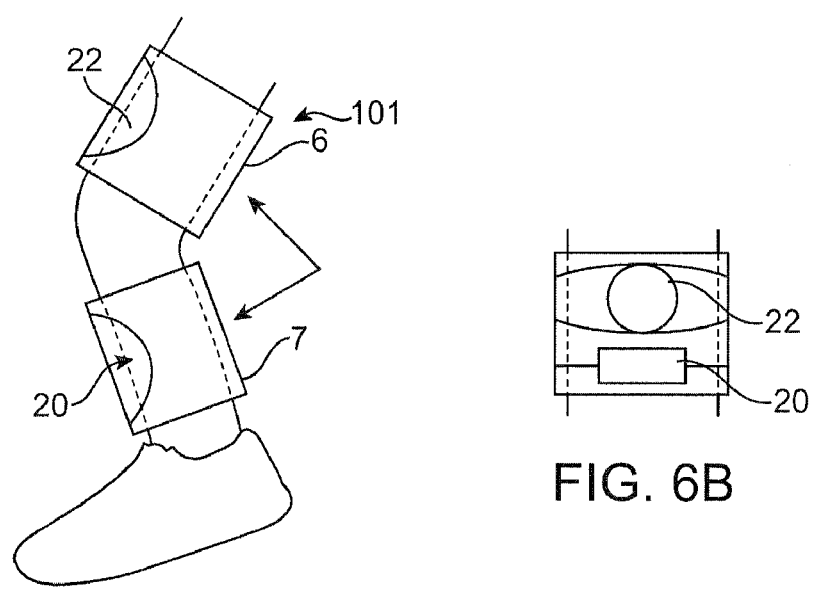
FIG. 6A
FIG. 6B

FLASH-N-SCRATCH

CROSS-REFERENCE TO RELATED PATENT APPLICATIONS

This application claims priority from Provisional Application U.S. Application 60/816,958, filed Jun. 27, 2006, incorporated herein by reference in its entirety.

BACKGROUND OF THE INVENTION

Hip hop and rap style musical performance is different than prior musical styles in that central to the performance is the disc jockey or "DJ". The DJ is a one man musician, modifying and crafting a beat and experience unique to the DJ and the moment. The spontaneous sound effects and rhythm accompaniments the DJ produced were central to early rap performances. DJs shared the stage equally with the singer/rapper.

As hip hop and rap music developed, the role of the DJ receded into the background of the music and performance experience. The singer/performer became the main focus. Many musicians and DJs desired the genre to place the DJ back 'in front' and more central to the performance and creativity of the music.

Prior interactive audio systems used by the DJ were not suitable for placing the DJ in front or back to a more central role in the performance because the DJ turntable and sound controls were not portable. Rather, they were bulky and stationary in relation to the performers and their performances which began to include more animation and dance on the singer/performer's part.

Much of the creative foundation of the musical style, that is the 'groove' of the performance, is centered on the DJ. By placing the DJ 'in the front' once again, this creative force can be significantly exploited. Similar conditions apply to the Techno musical style, where every performer refers to him/herself as a DJ.

SUMMARY OF THE INVENTION

The Flash-N-Scratch is a musical sound generating and sound modulating system for accompanying and creating sound and musical and nonaudio (light and visual) effects for various musical performances and various related entertainment applications. This system provides a lightweight audio or audio/visual effect system that allows the performer to DJ, rap or sing and controls all aspects of the entertainment performance simultaneously while moving freely about the stage or other performance venue.

A key aspect of the Flash-N-Scratch system is the use of one or more, and most commonly two, portable central control units that are affixed to or around some portion of the performer's body, such as the arm, torso or leg. These central controllers contain the functionality necessary to give the performer the ability to generate, modulate and personalize as many audio and nonaudio aspects of the performance as desired.

These central controllers are most commonly worn on the performer's forearms but may also be attached to the performer's torso or legs.

The Flash-N-Scratch system includes a sound generating section made up of one or more audio signal sources such as an MP3 or MP4 player, or flash memory stick or card reader, CD, DVD player, and the like, that, together with amplifiers and loudspeakers, generates music and musical effects when activated.

Within the system and present on the central controllers are at least two different sets of controlled touch, or "touchpad" devices. One of the touchpads functions as a so-called 'scratch' device. Once the MP3 or similar audio-signal generating component is turned on, this sound modulator, when struck ("scratched"), regulates the music or main melody track of the song according to a pre-determined program that can also be set to random effects according to the specific genre of music the device is programmed to play (rap or techno for example).

The second modulator touchpad is a 'flash' touchpad which, when struck, can pause or flash the rhythm and/or beat portion of the music being played, temporarily 'flashing' the volume, or sound, of the song while momentarily interrupting the music after it has been struck. This modulator can also be programmed to activate programmed sound effects that accompany the main music or melody being played by the sound generating section.

In addition to interrupting the music track when struck, the flash portion of the system present on the central controller may be connected to an LED light array or the like visual display. In this case, when this sound modulator is struck, the light array literally flashes simultaneously with the sound modulating effect. Similarly, the scratch modulators can be used to drive a nonaudio visual display if desired.

Control of the modulating effects the touchpads exert over the music and/or rhythm tracks of the audio signal provided by the generating device MP3/4 player, radio, disc player, etc is accomplished through microprocessor programming that overrides or modulates in a predetermined fashion the song or track played through the sound generating section.

The central controllers may, if desired, include one or more additional interrupters which allow the performer to further modify and personalize the music or the beat tracks of the performance. In addition, the central controllers contain various master controls such as "on-off" controls and volume controls to set the overall performance parameters.

The sound generating section, including audio signal source, amplifiers and loudspeakers, can be present in the central controllers which are worn by the wearer/performer. Alternatively, a portion of the sound generating section, such as the actual audio signal sources and the controls for the sound generating sections can be present on the central controllers and the amplifiers and speakers involved in providing the actual sound can be in a remote location which is in proximity to receive control signals and the flash and scratch modulating signals from the touchpads on the central controllers via an audio signal, radio signal, or via a Bluetooth® type transmission. Most commonly the audio signal sources are present on the central controllers.

In another version, the entire sound generating section (MP3 player, CD, radio and the like), and the amplifiers and speakers involved in providing the actual sound can be in a remote location which is in proximity to receive control signals and the flash and scratch modulating signals from the touchpads on the central controllers worn by the wearer/performer via an audio signal, radio signal, or via a Bluetooth® type transmission.

Thus, in one version of the system, the music generating section plays the sound through a speaker array built into the central controllers worn on the user/performer. The two flash and scratch modulator touchpads control the play and the programmed effects through this speaker array.

In another version the audio signal as well as the flash and scratch signal modulations are generated at the central controllers which send the audio signal to remotely connected amplifiers and speaker arrays specifically programmed to receive signals from the central controllers worn by the wearer/performer.

Each of the modulator touchpads can be programmed to affect one or more of the music tracks played by the music generator such as the main melody portion, the beat or rhythm portion, or both simultaneously.

The device is designed to be an interactive entertainment and musical device that is worn by the individual performer. When worn on the forearms, the device may be slipped over the forearms much as a fingerless long sleeve glove would be worn. The modulator touchpads, audio signal generating device, speakers or sound signal transmitter are built into the forearm covering. With this design, the wearer/performer can make various dance moves according to the music being played while altering the playback uniquely according to the wearer/performer's dance moves and as they strike or scratch the modulator touchpad. The wearer/performer thus can become both DJ and performer in a role central to the performance of the song.

Further, the device can have additional attachments that wrap around the torso incorporating the same controllers and players as worn on the forearms, and/or augmenting the devices worn on the forearms.

There can also be additional parts of the device worn on the leg that is the thigh or calf whereby the sound modulation is programmed to activate when the performer scratches and strikes the modulator touchpads, or is activated when the performer 'stomps' his/her foot on the floor at a certain pressure while dancing in a particular style such as 'step'.

BRIEF DESCRIPTION OF THE DRAWINGS

FIGS. 5A and 5B show an embodiment of the Flash-N-Scratch system worn on the torso.

FIGS. 6A and 6B show two embodiments of the Flash-N-Scratch system worn on the thigh or the shin, respectively.

DESCRIPTION OF THE EMBODIMENTS

Figure 1:
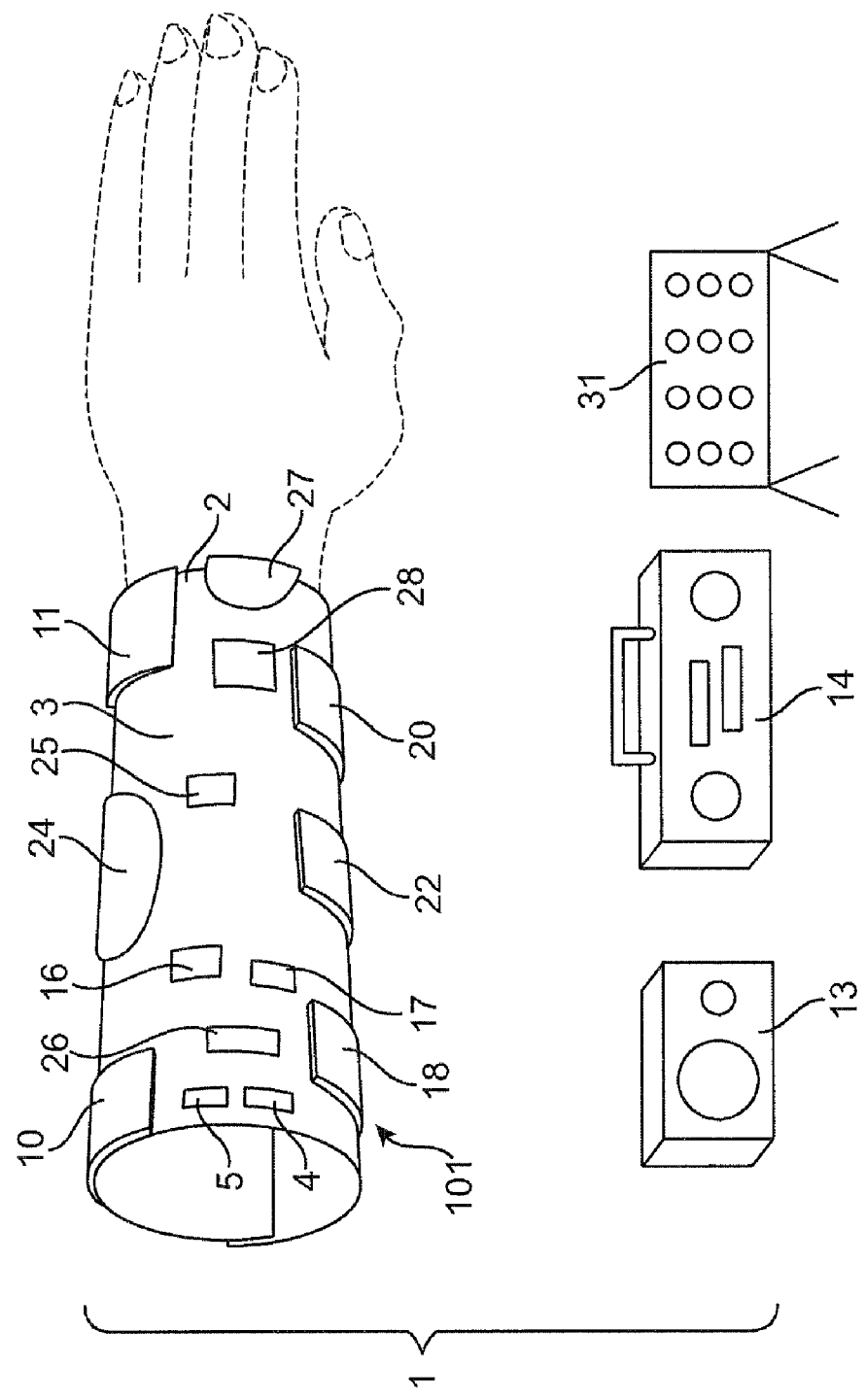
FIG. 1 shows schematically and elevationally a Flash-N-Scratch system having a central controller suitable for mounting on the left arm of a user in combination with a number of optional additional components.

Referring to the Figures, Flash-N-Scratch systems are shown which can be worn on the user's body. FIG. 1 shows an overall system 1 which includes a signal generator/modulator controller unit 101 which can be attached to the user's body. In the embodiment shown in FIG. 1 this attachment is carried out by constructing the controller on a flexible body 3 which can wrap around the user's forearm or, alternatively or in addition, by having a glove-like attachment 2 which can engage the user's hand.

FIGS. 5A and 5B show an alternative embodiment where the signal generator/modulator controller unit 101, including scratch modulator 22 and flash modulator 20, is adapted to fit around the user's torso by means of wrap/belt 8.

FIGS. 6A and 6B show an alternative embodiment where one or more signal generator/modulator controller units 101, including scratch modulator 22 and flash modulator 20, are adapted to fit about the user's thigh or leg by means of wraps 6 and 7.

The Flash-N-Scratch system 1 which includes at least one performer-wearable signal generator/modulator controller 101. As best shown in FIG. 1, signal generator/modulator controller 101 has a flexible or shapeable body 3 which is conformable about a portion of the user's body. Body 3 provides a unified wearable physical structure to the controller 101. Controller 101 typically includes at least one master control 26 which can serve as a system "on-off" switch, master volume control or the like.

Generator/modulator controller 101 also includes at least two interactive audio-signal generators. FIG. 1 shows three signal generators 16, 17 and 25. The system includes at least one scratch modulator 22 and/or 28 and at least one flash moderator 18 and/or 20 of the audio signals provided by the audio-signal generators 16, 17, and 25 and at least one speaker 10 and 11 which can be coupled through amplifiers and the various modulators to either or both of the audio-signal generators 16, 17 and 25.

The audio-signal generators 16, 17 and/or 25 can play either a core melody that the device will interact with or can generate separate sound effect and/or rhythm tracks that are played simultaneously with the core melody. Audio-signal generators 16, 17 and 25 can take the form of any sound generating device, e.g. a radio, a disk player, a tape player, a flash drive or an MP3 device, or can be a programmed sound chip with a built-in microprocessor including scratch modulators 22 and 28 and flash modulators 18 and 20, and can be purchased from existing manufacturers such as Sony, etc., or manufactured by those of skill in the art. In the embodiment of controller 101 depicted in FIG. 1, the audio-signal generators 16, 17 and 25 are shown as ports into which sound chips can be inserted. Those of skill in the art would readily adapt this design to accommodate the other forms of sound-generators useful in this invention.

The flash modulators 22 and/or 28 can function to interrupt delay or distort the core melody played by any one or more of the sound generators 16, 17 and/or 25. The scratch modulators can 18 and 20 modify a sound or rhythm track and/or activate a pre-recorded or programmed sound effect or rhythm track played by one or more of the audio generators 16, 17 and/or 25 connected to the modulators. Modulators 18, 20, 22, and 28 can be manufactured or bought from commercial vendors, and examples of such which include, but are not limited to track pad or touch and pressure sensitive surfaces, slides, switches, or buttons, such as Korg, Boss, Moog, or manufactured by those of skill in the art.

The one or more speakers 10, 11, 13 and/or 14 function to project either the core melody or the desired sound effect or both to the listeners and can be located on the wearer or remotely attached to the other components. Examples of such include, but are not limited to surface and internally mounted speakers 10 and 11 within the device 101 as worn on the body, bookshelf speakers 13 and portable 'boom box' type speaker systems 14 and can be purchased from Nakamichi, Denon, Infinity, etc. or manufactured by those of skill in the art.

The audio-signal generators 16 or 17 or 25 produce the same or different audio signals. For example, one signal can provide the main song or core melody while the other generators can provide one or several pre-programmed sound effects such as but not limited to the 'scratch' of a DJ's turntable, or the 'boom' of a bass tone, or other pre-programmed sounds that are synthesized according to the type of music played.

In another aspect, one signal can produce the pre-programmed sound effect while the other produces a distorted sound applied to the core melody played when activated by the modulator as programmed into a micro-processor within the device.

In an alternative embodiment, the audio system further contains at least one additional modulator 28, such that the system contains multiple interactive signal generators each independently connected to a modulator e.g., generator 16 connected to modulator 22 and generator 17 connected to modulator 20, etc.

Alternatively, a single signal generator can be connected to multiple modulators, such as for example a signal source 17 connected to scratch modulator 22 and flash modulator 18 to achieve a variety of effects.

The modulators are connected to the generators by direct hard-wired circuitry, or remotely, such that they function by direct activation when triggered playing the programmed or selected sound effect directly through the speaker independent of other sound generators within the device system. In this manner the wearer/performer can directly accompany the core music or melody with sound and other effects programmed into the modulator and audio generator without directly affecting the track or song played.

In an alternate aspect, at least one audio-signal interrupter 4 is interactively connected to at least one of the audio-signal generators 16, 17 or 25.

In a yet further aspect, the system contains at least two audio-signal interrupters 4 and/or 5, such that the controller 101 contains one pair of interactive signals generators 16 and 17 each independently connected to a scratch modulator 22 or 28 and/or a flash modulator 18 or 20 and each independently connected to an audio-signal interrupter 4 or 5.

In a further aspect, the audio/modulator system may further contain one or more light sources 24, 27 and/or 31 interactively connected to at least one of the audio-signal generators 16, 17 and/or 25 or to at least one of the scratch modulators 22 and/or 28 or flash modulators 18 and/or 20 in the system. The light sources 24 and/or 27 function to create a visual effect to accentuate the sound or beat of the music or to accentuate the effects the one or more modulators have on the music or programmed sound effect generated by the audio-signal generator 16. These light sources are activated when the audio-signal generator is affected by one of the modulators e.g. 22 or 18 or simply when the modulator is touched or activated by touch or pressure. Examples of lights sources include, but are not limited to LED, LCD and conventional (incandescent, fluorescent, ultraviolet or arc light sources) and can be purchased from SunLED Corp., Knightbright, or manufactured by those of skill in the art. The light source can be on the device worn on the performer or remotely connected to the other device components.

The components of the system can directly or remotely connect to the other components. In one aspect, the modulators 18, 20, 22 and/or 28 and one or more of the speakers e.g., 14 together with associated amplifiers can be remotely connected to the audio-signal generators 16, 17 and/or 25 which are present on the one or more central controllers 101 worn by the performer. In another aspect, the modulators 18, 20, 22 and/or 28 and the audio-signal generator 16, 17 and/or 25 are all present on the one or more central controllers 101 but all are in turn connected to remotely located amplifiers and speakers e.g., 14. Both of these embodiments allow greater freedom of movement for the wearer/performer, and increased sound generation through the use of portable speaker systems, music/audio generators and additional modulators in place of the speakers on the wearer/performer's device.

Yet further, the speaker systems 13 and 14 can be remotely connected to the audio-signal generators 16, 17 and/or 25 and the modulators 18, 20, 22 and/or 28 with speakers 11 and 12 and the generators and modulators all present on the one or more central controllers on one or more wearer/performers. This aspect allows multiple wearers/performers to simultaneously play either programmed or 'random' effects as desired through one set of multiple output speakers programmed with the audio generator MP3, etc and interactively accompanying the core music track played through the audio generator.

Figure 2:
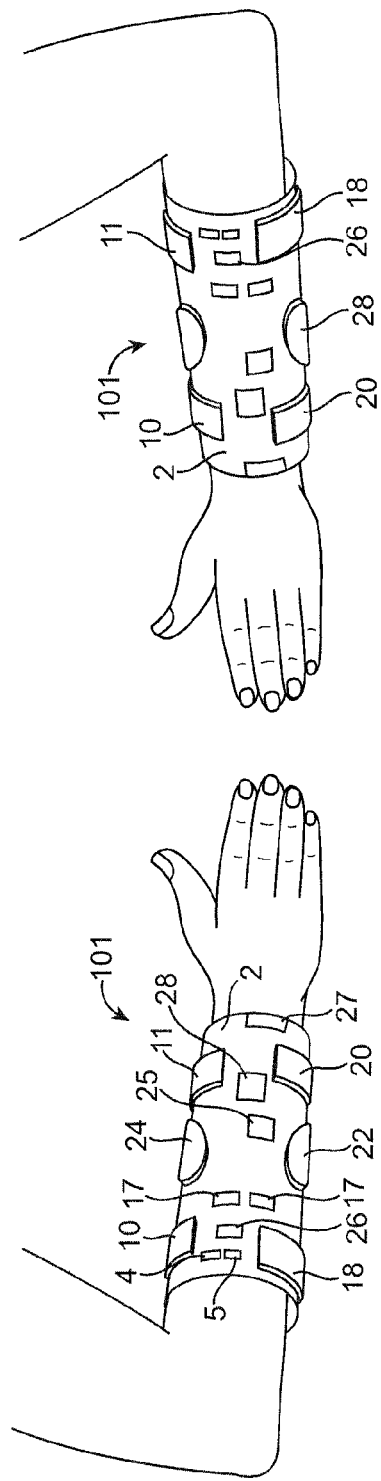
FIG. 2 shows the Flash-N-Scratch system in a generally downward-looking dorsal perspective view wherein pair of wearable central controller devices is worn on the forearms.

In another aspect, the FIG. 1 comprises at least two audio-signal generator controllers 101, one or more of which of which can produce a beat track and the others of which can produce a music track. In this aspect it is often desired to have multiple controller units 101 mounted on the user's body, as shown in FIG. 2. In this aspect different control units 101 can provide and/or modulate different tracks. In the embodiment shown in FIG. 2, for example, one arm could carry the controller for the beat track and the other arm could carry the controller for the music track.

Since the controllers are designed to be worn by a performer, the controllers each further contain a means 2, 6, 7 or 8 to attach the signal controller/generator units 101 to the wearer/performer's body. Any suitable means for accomplishing this affixing or retaining can be used. Examples of such include, but are not limited to a garment, belt, strap or band or the like that affixes the audio-signal generator and modulator unit to a wearer/performer's body in various locations such as the wearer/performer's forearm, torso, calf or thigh.

Figure 4:
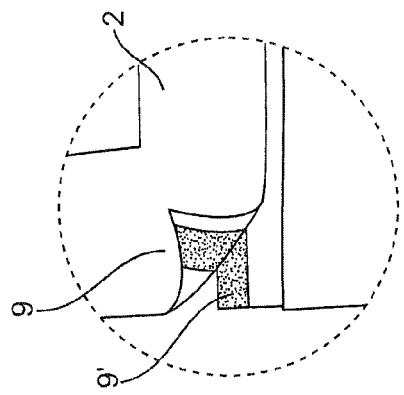
FIG. 4 is an expanded scale view of portion 4-4' of the Flash-N-Scratch central controller shown in FIG. 3.
Figure 3:
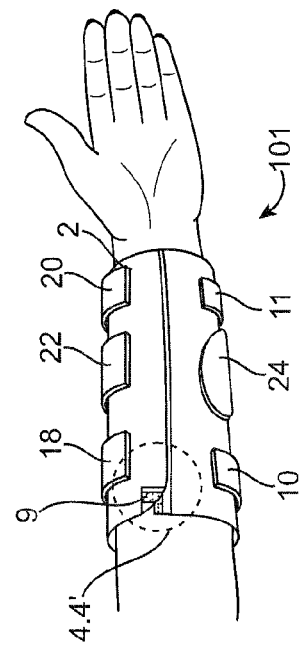
FIG. 3 shows the "left hand" central controller of the Flash-N-Scratch system shown in FIGS. 1 and 2 also in a generally downward-looking, but volnar perspective view.
Figure 7A:
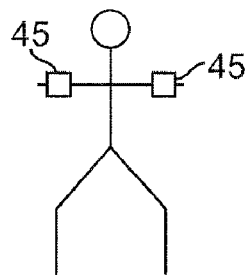
FIGS. 7A through 7I show nine different configurations of multiple-controller embodiments of the Flash-N-Scratch system.
Figure 7B:
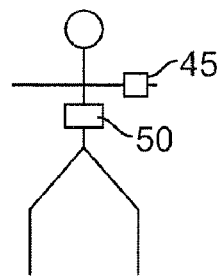
Figure 7C:
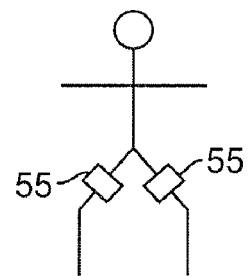
Figure 7D:
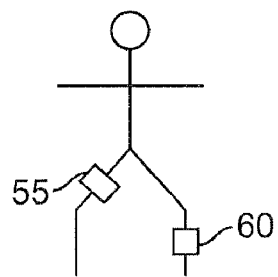
Figure 7E:
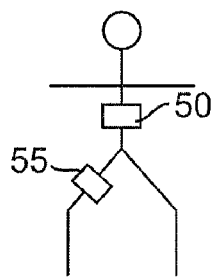
Figure 7F:
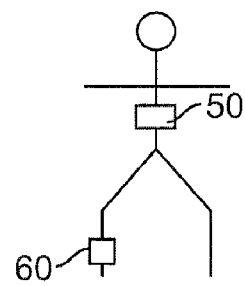
Figure 7G:
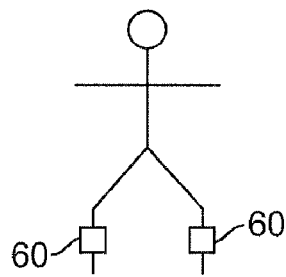
Figure 7H:
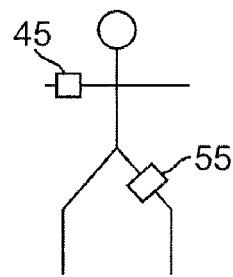
Figure 7I:
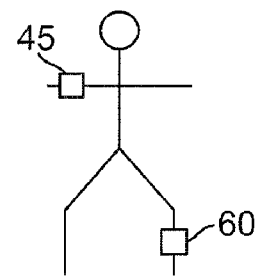

FIGS. 1, 2 and 3 depict a flexible body 2 which is shown wrapping around the user's forearm and fastened there such as by hook and loop Velcro® fasteners 9 and 9' detailed in FIG. 4 to position the signal generator/controller unit there. FIG. 5 shows a signal generator/controller attached to a belt 8 which fits around the user's torso, and again held in position such as with Velcro® fasteners 9 and 9'. FIG. 6 shows embodiments of the invention suitable for placement on the user's thigh using strap 6 or calf using strap 7.

With this variety of body-wearable signal generator/controller units 101, it is possible to come up with a wide variety of device configurations which are individualized to meet the needs and the style of a variety of music and a variety of performers of that music. This is illustrated in FIG. 7 where nine examples of different device configurations are shown. In these schematic views of the various configurations, device 45 is a general depiction of an arm-wearable controller, device 50 is a general depiction of a torso-wearable controller, device 55 is a general depiction of a thigh-wearable controller, and device 60 is a general depiction of an calf or ankle-wearable controller, It is to be understood that while the invention has been described in conjunction with the above embodiments, that the foregoing description and examples are intended to illustrate and not limit the scope of the invention. Other aspects, advantages and modifications within the scope of the invention will be apparent to those skilled in the art to which the invention pertains.

What is claimed is:

1. An audio system to send an audio signal to a speaker, the system comprising:

a glove or an arm band to wrap around an arm of a performer; and one or more controllers mounted upon the glove or arm band to affix the controllers to the arm of the performer when the glove or arm band is worn by the performer, wherein the one or more controllers include a master control including an on/off control or volume control, at least one interactive audio signal generator to produce at least two audio signals, and at least one performer-controlled modulator to modulate at least one of the audio signals produced by the audio signal generators, said at least one performer-controlled modulator producing at least one performer-controlled modulated audio signal to be projected by the speaker.

2. The audio system of claim 1, further comprising at least two signal generators each producing an audio signal and at least two performer-controlled modulators with at least two of these audio signals each being independently modulated by separate performer-controlled modulators and each producing a separate performer-controlled modulated audio signal with the at least two modulated audio signals being projected by the speaker.

3. The audio system of claim 1, further comprising at least one audio signal interrupter interactively connected to at least one of the audio signal generators.

4. The audio system of claim 2, further comprising at least two audio signal interrupters each independently connected to a different signal generator.

5. The audio system of claim 1, further comprising a light source interactively connected to at least one audio signal generator.

6. The audio system of claim 1, wherein the audio signal generators comprise at least one of a radio, a CD/disc player, DVD player, a tape player, a flash drive or an MP3 type device.

7. The audio system of claim 1, wherein the speaker is remote from the wearable controller and is remotely connected to an audio signal generator which is remote from the glove or arm band.

8. The audio system of claim 1, wherein the speaker is directly connected to the audio signal generator and mounted upon the glove or arm band.

9. The audio system of claim 1, comprising at least two of the audio-signal generators which produce the same audio signal.

10. The audio system of claim 1, comprising at least two audio signal generators which produce independent audio signals.

11. The audio system of claim 10, wherein at least one of the audio signal generators produces a beat track and at least one the audio signal generators produces a music track.

12. The audio system of claim 1, comprising two separate central controllers each affixed to a different region of the performer's body.

13. The audio system of claim 1, wherein the performer-controlled modulator functions to interrupt, delay, or distort an audio signal produced by the audio signal generator.

14. The audio system of claim 1, wherein the performer-controlled modulator functions to produce a turntable scratch sound effect.

15. An audio system to send an audio signal to a speaker, the system comprising:

a flexible body to wrap around a thigh or calf of a performer; and one or more controllers mounted upon the flexible body to affix the controllers about the thigh or calf of the performer when the flexible body is worn by the performer, wherein the one or more controllers include a master control including an on/off control or volume control, at least one interactive audio signal generator to produce at least two audio signals, and at least one performer-controlled modulator to modulate at least one of the audio signals produced by the audio signal generators, said at least one performer-controlled modulator producing at least one performer-controlled modulated audio signal to be projected by the speaker.

16. The audio system of claim 15, wherein the performer-controlled modulator functions to interrupt, delay, or distort an audio signal produced by the audio signal generator.

17. The audio system of claim 15, wherein the performer-controlled modulator functions to produce a turntable scratch sound effect.

18. The audio system of claim 15, further comprising at least two signal generators each producing an audio signal and at least two performer-controlled modulators with at least two of these audio signals each being independently modulated by separate performer-controlled modulators and each producing a separate performer-controlled modulated audio signal with the at least two modulated audio signals being projected by the speaker.

19. The audio system of claim 15, further comprising at least one audio signal interrupter interactively connected to at least one of the audio signal generators.

* * * * *